United States Patent
Vaidya et al.

(10) Patent No.: US 9,635,524 B2
(45) Date of Patent: Apr. 25, 2017

(54) MOBILE DEVICE PASS THROUGH FOR SIGNALING MESSAGES

(71) Applicant: Cellco Partnership, Basking Ridge, NJ (US)

(72) Inventors: Samir S. Vaidya, Highland Park, NJ (US); S M Masudur Rahman, Edison, NJ (US); Ji Hoon Kim, Lyndhurst, NJ (US); Dan Sun, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 328 days.

(21) Appl. No.: 14/109,294

(22) Filed: Dec. 17, 2013

(65) Prior Publication Data

US 2015/0172879 A1    Jun. 18, 2015

(51) Int. Cl.
  *G06F 15/16*    (2006.01)
  *H04W 4/12*    (2009.01)
  *H04W 4/00*    (2009.01)

(52) U.S. Cl.
  CPC .............. *H04W 4/12* (2013.01); *H04W 4/003* (2013.01)

(58) Field of Classification Search
  CPC ................................ H04W 4/12; H04W 4/003
  See application file for complete search history.

(56) References Cited

U.S. PATENT DOCUMENTS

| | | | |
|---|---|---|---|
| 2009/0252117 A1* | 10/2009 | Sherman | H04W 36/14 370/331 |
| 2009/0318185 A1* | 12/2009 | Lee | H04M 1/72527 455/550.1 |
| 2014/0018130 A1* | 1/2014 | Chang | G06F 13/385 455/557 |
| 2014/0223453 A1* | 8/2014 | Li | G06F 9/547 719/330 |
| 2015/0229635 A1* | 8/2015 | Saridaki | H04L 65/1006 726/8 |

* cited by examiner

*Primary Examiner* — June Sison
*Assistant Examiner* — Steven Nguyen

(57) ABSTRACT

A mobile device pass through for signaling messages procedure allows smart devices to participate in and control multimedia communications by providing the ability to control multimedia communications to the smart device by the mobile device. A mobile device and a smart device establish a channel of communications between the mobile device and a web browser executing on the smart device, e.g. when both are connected to the same Wi-Fi access point. When the web browser accesses a web application that utilizes signaling messages to control multimedia content, the web browser will send signaling message requests to the mobile device. The mobile device, in turn, generates and forwards the signaling message. Media content is delivered directly to the smart device without passing through the mobile device or the established channel of communications.

20 Claims, 8 Drawing Sheets

MOBILE DEVICE PASS THROUGH FOR SIGNALING MESSAGES

BACKGROUND

In recent years, the explosion of technology has continued. New ideas have emerged to mix together various software and hardware solutions to provide the user with intuitive experiences that simplify the user of these new technologies. Currently, with the influx of various smart devices as well as the emergence of software solutions for browsers, a true platform independent method of communications may be possible.

A typical smartphone is built with the ability to manage communications, such as voice calls and/or video calls. This ability includes generating, sending, receiving, and processing signaling messages related to control of these communications. For example, signaling messages are used for initiating or terminating a voice call or a videoconference. The smartphone, however, may not always provide the optimal environment in which to participate in these communications. For example, a videoconference involving more than one other party may better be experienced if displayed on a large screen TV.

Other consumer devices, such as large screen TVs and tablets, have been developed with sufficient capabilities to process the media related to these communications and provide a larger more desirable user interface for many types of usage, but many of these consumer devices lack the management ability (e.g. signaling message processing) of a typical smartphone. As in the above examples, a large screen TV may be able to display the audio and video of the videoconference, but is unable to initiate or terminate the videoconference call. Thus, many of these so-called "smart" devices may provide a better environment in which to participate in multimedia communications, but they lack the ability to manage such communications.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

As above, a need exists to take advantage of existing technology, for example Web Real Time Communications (WebRTC) application programming interfaces (APIs), through a web browser on a smart device to gain access to and thereby leverage underlying systems, such as the Session Initiation Protocol (SIP) stack and IP Multimedia Subsystem (IMS) for signaling on the mobile device, and provide smart devices on a shared network access to use the mobile device level systems/frameworks to perform device level tasks on any other smart device via the web browser on the smart device.

The various examples disclosed herein relate to a mobile device pass through for signaling messages that allows smart devices to participate in and control multimedia communications by providing the ability to control multimedia communications to the smart device through the mobile device. Signaling messages are messages related to the control of a multimedia communication (e.g., used to establish or terminate a voice or media call) rather than the multimedia content of the multimedia communication (e.g., used to provide voice or media data).

The mobile device and smart device establish, for example, a local channel of communications between a signaling stack on the mobile device and a web browser executing on the smart device. The mobile device and smart device are, for example, both connected to the same Wi-Fi access point and the established channel of communications is, for example, a WebSocket over Wi-Fi. In this example, the web browser executing on the smart device supports WebRTC API functionality. When the web browser seeks access to a web application out on the network, which utilizes defined signaling messages (e.g. not supported by the smart device) to control multimedia content; the web browser executing on the smart device will, for example, send a signaling message request to the signaling stack on the mobile device via the WebSocket over Wi-Fi. The mobile device, using an existing API on the mobile device, will, in turn, generate the signaling message and pass the generated signaling message to a remote peer over the appropriate network. In reply to the generated signaling message, the web application will, for example, deliver the related media content directly to the smart device without passing through the mobile device or the established local channel of communications.

Figure 1:
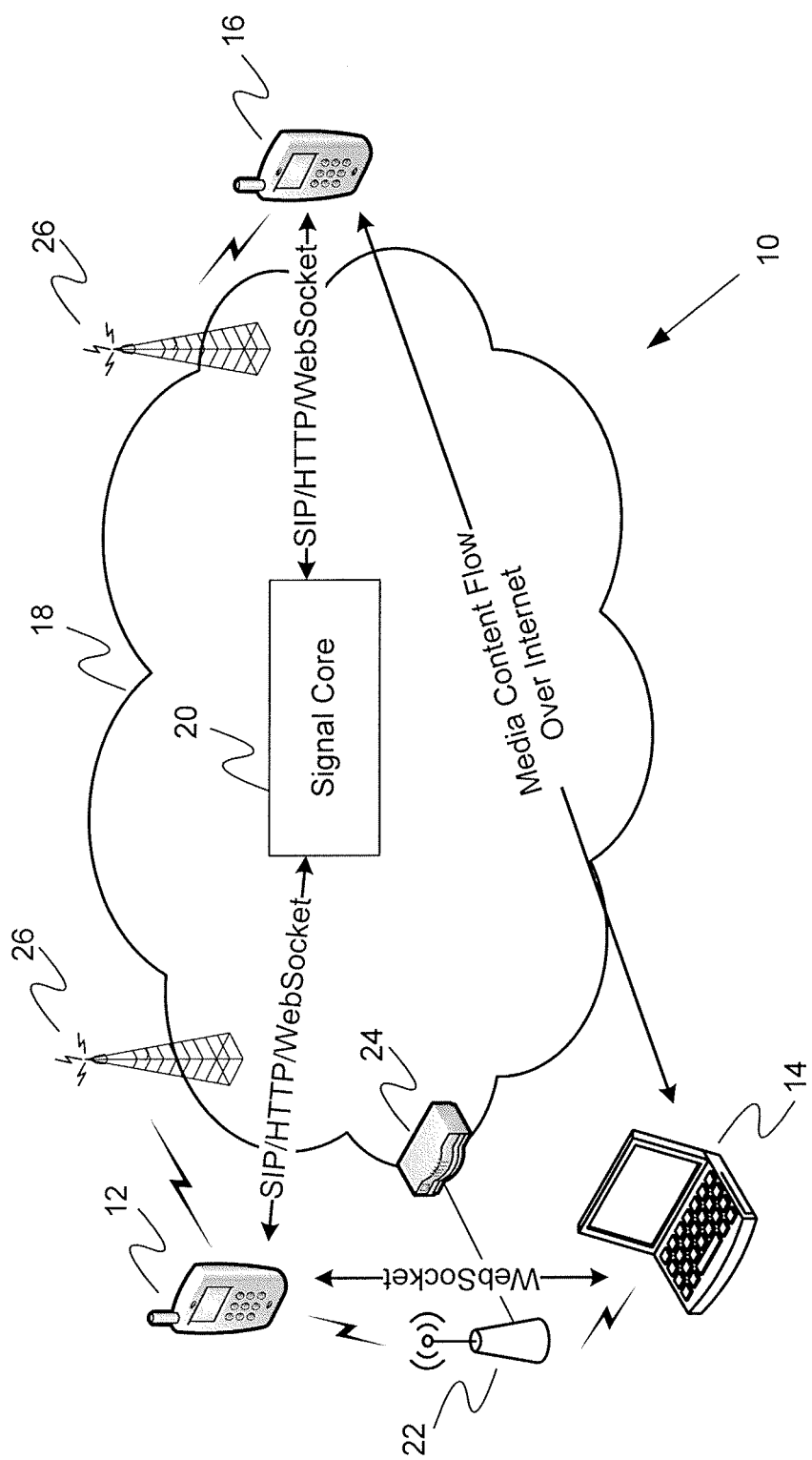
FIG. 1 is a high-level functional block diagram of an example of a system architecture that provides mobile device pass through for signaling messages.

Reference now is made in detail to the examples illustrated in the accompanying drawings and discussed below. FIG. 1 illustrates the system architecture of the mobile device pass through for signaling messages.

FIG. 1 illustrates a system 10 offering a variety of communication services, including communications for wireless data by mobile devices 12, 16 of various users as well as a smart device 14 sharing local wireless data communications via a wireless access point 22 with the mobile device 12. The example shows simply two mobile devices 12 and 16, a smart device 14, a wireless access point 22, and a communication network 18. The devices 12 and 16 are examples of mobile devices that may be used for mobile device pass through for signaling messages, although devices 12 and 16 also support a variety of other functions and services through communication network 18. However, the network 18 will provide similar communications for many other similar users as well as for mobile devices/users that do not participate in mobile device pass through for signaling messages. The network 18 provides mobile wireless communications services to those devices as well as to other mobile devices (not shown), for example, via a number of base stations (BSs) 26.

The network 18 also provides communications services to smart device 14 connected to wireless access point 22 via a local router 24. The example shows simply one smart device 14, however, multiple smart devices may utilize mobile device 12 for mobile device pass through for signaling messages. Furthermore, additional smart devices may connect to wireless access point 22 and communicate via local router 24 with and/or via network 18 without utilizing mobile device 12 for mobile device pass through for signaling messages, e.g. because engaged in communications that do not require the particular signaling or because they incorporate the appropriate signaling stack as a native capability.

In addition, control of at least some of the communications services is provided via a signal core 20. The present techniques may be implemented in any of a variety of available networks 18 and/or on any type of mobile device compatible with such a network 18, and the drawing shows only a very simplified example of a few relevant elements of the network 18 for purposes of discussion here.

Mobile devices 12, 16 can take the form of portable handsets, smart-phones or personal digital assistants, although they may be implemented in other form factors. Program applications, including an application to assist in the mobile device pass through for signaling messages can be configured to execute on many different types of mobile devices 12, 16. For example, a mobile device application can be written to execute on a binary runtime environment for mobile (BREW-based) mobile device, a Windows Mobile based mobile device, Android, iOS for iPhone or iPad, Java Mobile, or RIM based mobile device such as a BlackBerry or the like. Some of these types of devices can employ a multi-tasking operating system.

Examples of a smart device 14 include a laptop or personal computer (PC), a tablet or e-reader, and a television (TV) or other display device. Smart device 14 is capable of communicating with the network 18 via a local data communications network. The local data communications network, for example, is Wi-Fi provided via wireless access point 22 or Ethernet over cable or optical fiber connected directly to local router 24. The smart device 14 is also capable of communicating with mobile device 12 via the local data communications network, but does not rely on the mobile device 12 to communicate with the network 18 for all purposes. For example, smart device 14 accesses web applications via network 18 directly, but signaling messages related to at least one web application (e.g. videoconferencing) pass through mobile device 12. Smart device 14 executes, for example, a web browser to establish communications with and/or via network 18. Smart device 14, in such an example, uses the web browser to establish communications with a web application via network 18.

Each mobile device 12, 16 communicates over the air with a base station 26 and through the traffic network 18 for various voice and data communications, e.g. through the Internet with a server and/or with application servers. Alternatively, mobile device 12, for example, communicates via wireless access point 22 and local router 24 with and/or via network 18.

For purposes of further discussion, we will focus on functions in support of mobile device pass through for signaling messages. For a given communication, an application program within the mobile device 12 or the web browser executing on smart device 14 may be considered as a 'client' and programming within network 18 and/or signal core 20 may be considered as the 'server' application for the particular communication.

In one example, a user of smart device 14 desires to call a user of mobile device 16. When the call is placed, as described in further detail below in relation to FIG. 7, smart device 14 requests mobile device 12 to generate the necessary signaling messages to control the call. The request is passed, in this example, over Wi-Fi via the wireless access point 22. In turn, mobile device 12 generates and sends the necessary signaling messages to signal core 20, which forwards signaling messages or generates and sends other but related signaling messages to the mobile device 16 (depending on requirements of the applicable protocol). Once the call is established, media related to the call (e.g. voice and/or video) is exchanged directly between smart device 14 and mobile device 16 without passing through mobile device 12. Any subsequent signaling messages, however, are passed through mobile device 12.

The mobile device pass through for signaling messages under consideration here may be provided by touch screen type mobile devices as well as by non-touch type mobile devices. Hence, our simple example shows the mobile device 12 as a non-touch type mobile device, however, mobile device 12 may alternatively be a touch screen type mobile device. Implementation of the mobile device pass through for signaling messages will involve at least some execution of programming in the mobile devices as well as implementation of user input/output functions and data communications through the network 18, from the mobile devices. It may be useful to consider the functional elements/aspects of examples of two types of mobile devices 12, 16, at a high-level.

Figure 2:
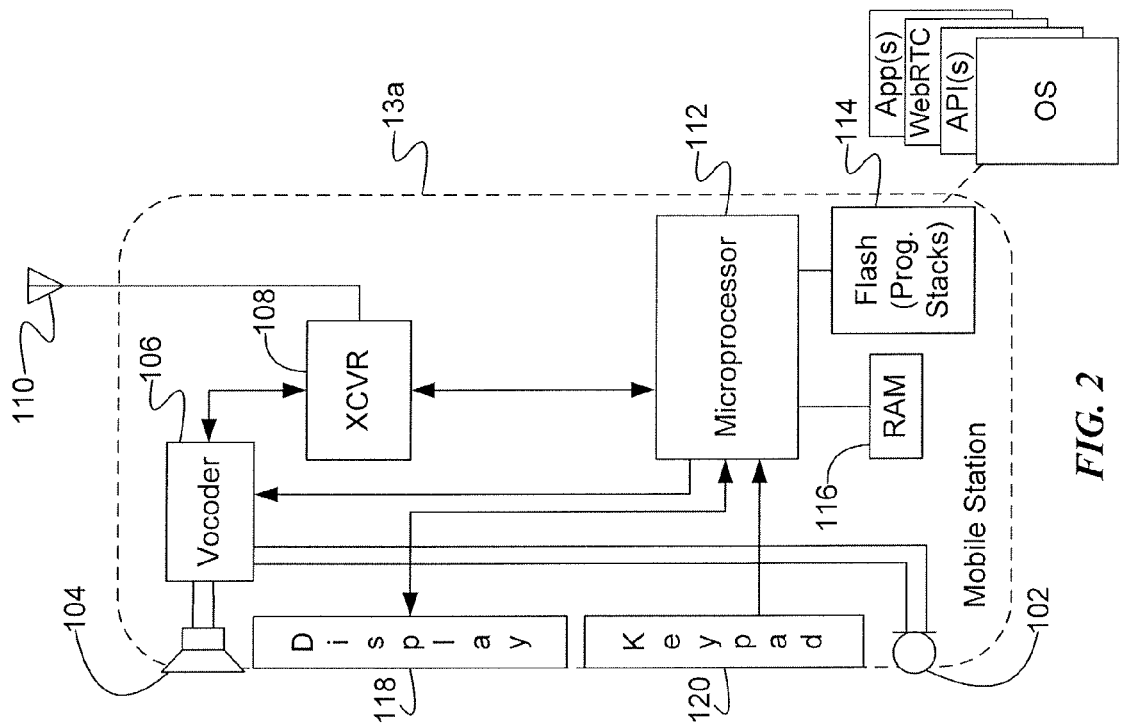
FIG. 2 is a high-level functional block diagram of an example of a non-touch type mobile device as may be utilized for mobile device pass through for signaling messages with a system architecture like that shown in FIG. 1.

For purposes of such discussion, FIG. 2 provides a block diagram illustration of an example of a non-touch type mobile device 13a. Either or both of the mobile devices 12, 16 of FIG. 1 may be implemented as a non-touch mobile station as shown at 13a in FIG. 2. Although the mobile device 13a may be a smart-phone or may be incorporated into another device, such as a personal digital assistant (PDA) or the like, for discussion purposes, the illustration shows the mobile device 13a is in the form of a handset. The handset embodiment of the mobile device 13a functions as a normal digital wireless telephone station. For that function, the station 13a includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, including wireless data communications, the handset 13a also includes at least one digital transceiver (XCVR) 108. Today, the handset 13a would be configured for digital wireless communications using one or more of the common network technology types. The concepts discussed here encompass embodiments of the mobile device 13a utilizing any digital transceivers that conform to current or future developed digital wireless communication standards. The mobile device 13a may also be capable of analog operation via a legacy network technology.

The transceiver 108 provides two-way wireless communication of information, such as vocoded speech samples and/or digital information, in accordance with the technology of the network 18. The transceiver 108 also sends and receives a variety of signaling messages in support of the various voice and data services provided via the mobile device 13a and the communication network, such as the signaling messages requested by smart device 14 in relation to a call with mobile device 16. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

The mobile device 13a includes a display 118 for displaying messages, menus or the like, call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

A microprocessor 112 serves as a programmable controller for the mobile device 13a, in that it controls all operations of the mobile device 13a in accord with programming that it executes, for all normal operations, and for operations involved in the mobile device pass through for signaling messages procedure under consideration here. In the example, the mobile device 13a includes flash type program memory 114, for storage of various "software" or "firmware" program routines and mobile configuration settings, such as mobile directory number (MDN) and/or mobile identification number (MIN), etc. The mobile device 13a may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, application programming interface(s) (APIs), call processing software, and vocoder control software, and any of a wide variety of other applications, such as client browser software and short message service software, any of which may operate with active user intervention or in the background without user intervention. The APIs include signaling messages functionality (e.g. SIP and/or other protocol(s) supported on the IMS) for generating, delivering, receiving, and processing signaling messages with and/or via a signal core, such as signal core 20. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile device 13a includes a processor, and programming stored in the flash memory 114 configures the processor so that the mobile device is capable of performing various desired functions, including in this case the functions involved in the technique for providing mobile device pass through for signaling messages.

Figure 3:
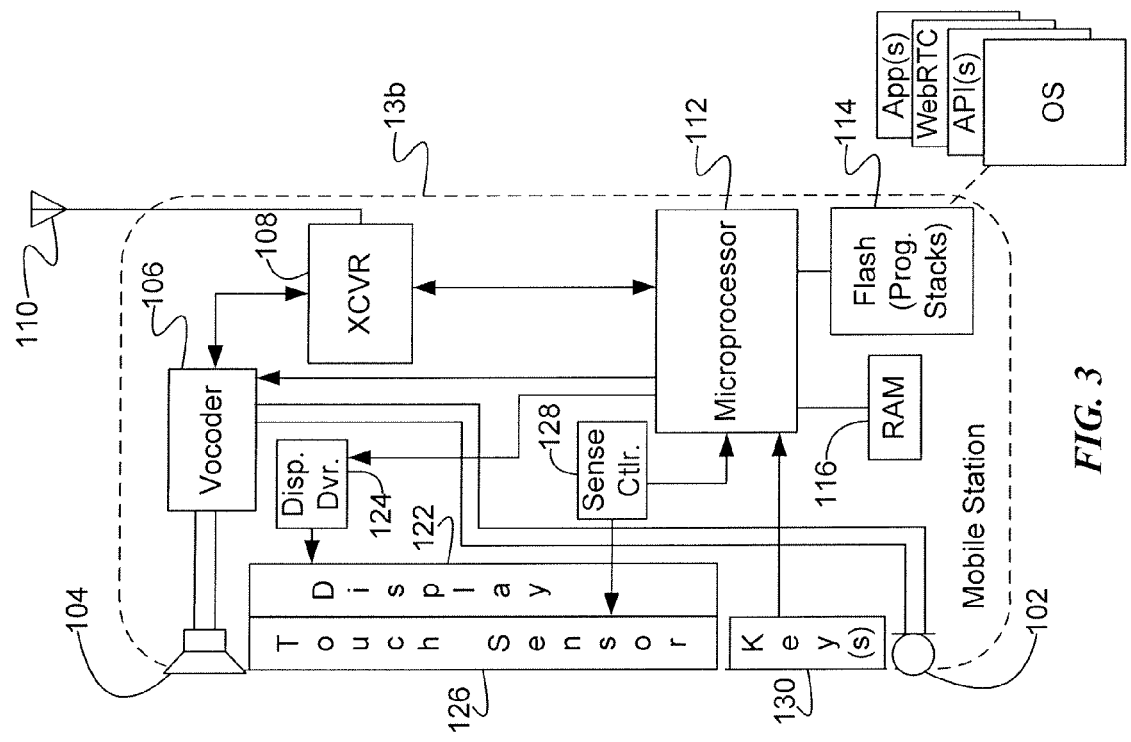
FIG. 3 shows, in high-level functional block diagram form, an example of a touch screen type mobile device as may be utilized for mobile device pass through for signaling messages with a system architecture like that shown in FIG. 1.

For purposes of such a discussion, FIG. 3 provides a block diagram illustration of an example of a touch screen type mobile device 13b. Either or both of the mobile devices 12, 16 of FIG. 1 may be implemented as a touch screen mobile station as shown at 13b in FIG. 3. Although possibly configured somewhat differently, at least logically, a number of the elements of the touch screen type mobile device 13b are similar to the elements of mobile device 13a, and are identified by like reference numbers in FIG. 3. For example, the touch screen type mobile device 13b includes a microphone 102, speaker 104 and vocoder 106, for audio input and output functions, much like in the earlier example. The mobile device 13b also includes at least one digital transceiver (XCVR) 108, for digital wireless communications, although the handset 13b may include an additional digital or analog transceiver. The concepts discussed here encompass embodiments of the mobile device 13b utilizing any digital transceivers that conform to current or future developed digital wireless communication standards. As in the mobile device 13a, the transceiver 108 provides two-way wireless communication of information, such as vocoded speech samples and/or digital information, in accordance with the technology of the network 18. The transceiver 108 also sends and receives a variety of signaling messages in support of the various voice and data services provided via the mobile device 13b and the communication network, such as the signaling messages requested by smart device 14 in relation to a call with mobile device 16. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

As in the example of mobile device 13a, a microprocessor 112 serves as a programmable controller for the mobile device 13b, in that it controls all operations of the mobile device 13b in accord with programming that it executes, for all normal operations, and for operations involved in the mobile device pass through for signaling messages procedure under consideration here. In the example, the mobile device 13b includes flash type program memory 114, for storage of various program routines and mobile configuration settings. The mobile device 13b may also include a non-volatile random access memory (RAM) 116 for a working data processing memory. Of course, other storage devices or configurations may be added to or substituted for those in the example. Similar to the implementation of mobile device 13a, the flash type program memory 114 stores firmware such as a boot routine, device driver software, an operating system, API(s), call processing software, and vocoder control software, and any of a wide variety of other applications, such as client browser software and short message service software, any of which may operate with active user intervention or in the background without user intervention. The APIs include signaling messages functionality (e.g. SIP and/or other protocol(s) supported on the IMS) for generating, delivering, receiving, and processing signaling messages with and/or via a signal core, such as signal core 20.

Hence, outlined above, the mobile device 13b includes a processor, and programming stored in the flash memory 114 configures the processor so that the mobile device is capable of performing various desired functions, including in this case the functions involved in the technique for providing mobile device pass through for signaling messages.

In the example of FIG. 2, the user interface elements included a display and a keypad. The mobile device 13b may have a limited number of keys 130, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the mobile device 13b in our example includes a display 122, which the microprocessor 112 controls via a display driver 124, to present visible outputs to the device user. The mobile device 13b also includes a touch/position sensor 126. The sensor 126 is relatively transparent, so that the user may view the information presented on the display 122. A sense circuit 128 sensing signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile device 13b. The microphone 102 and speaker 104 may be used as additional user interface elements, for audio input and output.

The structure and operation of the mobile devices 13a and 13b, as outlined above, were described to by way of example, only.

Figure 4:
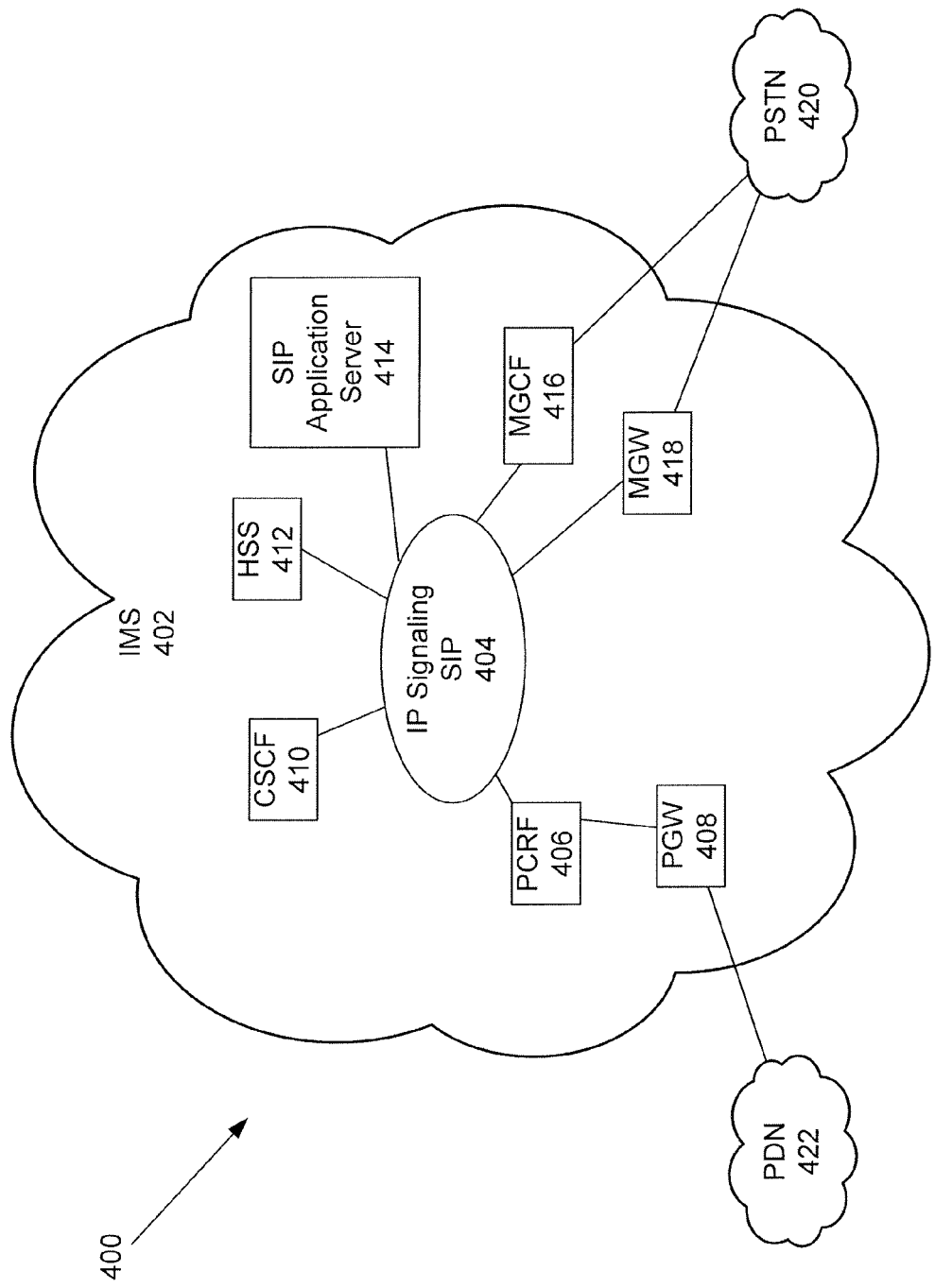
FIG. 4 is a diagram of an example of an Internet Protocol (IP) multimedia subsystem (IMS) type network infrastructure useful in providing mobile device pass through for signaling messages, including an IMS, a public switched telephone network (PSTN) and a packet data network (PDN).

FIG. 4 is a diagram of an example of an IMS network infrastructure 400. Along with other services, the IMS network infrastructure 400 in the example provides mobile device pass through for signaling messages. The IMS network infrastructure includes IMS 402, PDN 422, and a PSTN 420. The IMS 402 may serve, for example, as the signal core 20 of FIG. 1. As shown, IMS 402 can include an IP signaling server 404 that can provide session initiation protocol (SIP) support. SIP server 404 can be connected to packet core rules function (PCRF) block 406, which can be connected to packet gateway (PGW) 408, which is a node that terminates the interface towards PDN 422, as shown. PDN 422 may be a public PDN, such as the Internet, and/or a private PDN maintained and operated by a mobile carrier, service provider, or other entity or organization. The PDN 422, for example, may be the network 18 in FIG. 1. The SIP server 404 can be connected to a call session control function block (CSCF) 410 as shown, as well as a home subscriber server (HSS) 412 and a SIP application server 414. Media gateway control function (MGCF) 416 is shown with media gateway (MGW) 418 connected between the SIP server 404 and PSTN 420. Some and/or all of SIP server 404, PCRF 406, PGW 408, CSCF 410, HSS 412, SIP application gateway 414 and MGCF 416 are, for example, implemented in computers and/or routers running applicable software, such as the computer of FIG. 9 described below.

As described above in relation to FIGS. 2 and 3, mobile devices 12, 16 support the capability to generate, send, receive, and process signaling messages, such as those signaling messages needed to control a call controlled via the IMS signaling core 20. Mobile devices 12, 16 also support the capability to exchange and process media related to a call, such as voice and/or video. Smart device 14 also supports the capability to exchange and process media related to a call. Smart device 14, however, does not support the capability to generate, send, receive, and process signaling messages. Therefore, as described in further detail below, mobile device pass through for signaling messages facilitates, for example, smart device 14 to manage a call with mobile device 16 by passing requests for signaling messages from smart device 14 to mobile device 12, which in turn forwards appropriate signaling messages to mobile device 16. In addition, mobile device pass through for signaling messages further facilitates call management by smart device 14, for example, when mobile device 12 receives responses to the appropriate signaling messages from mobile device 16 and passes or generates appropriate responses back to smart device 14.

With an understanding of elements that may be used or operate in system 10, as outlined above and shown at FIGS. 1-4, it may be helpful next to consider several examples of procedures involved in or relating to mobile device pass through for signaling messages.

Figure 5:
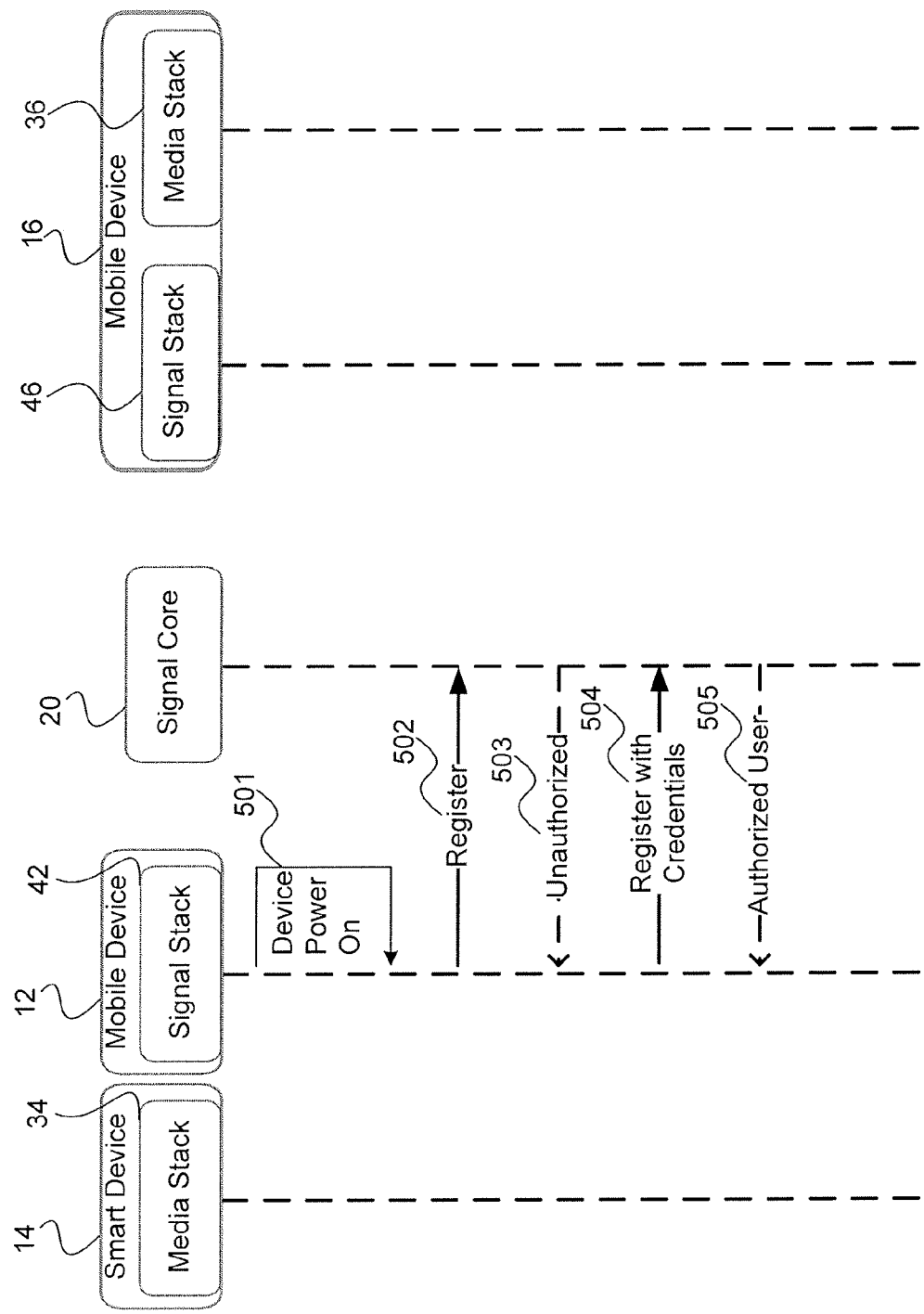
FIG. 5 is a high-level process flow of an example of a registration sequence between a mobile device and a signal core, in a system like that of FIG. 1.

FIG. 5 is a high-level process flow of an example of a registration sequence between the mobile device 12 and the signal core 20 as part of the mobile device pass through for signaling messages. In FIG. 5, as well as FIGS. 6-8, smart device 14 includes a media stack 34 for processing media, such as voice and/or video. Smart device 14, however, does not include a signal stack. Mobile device 12 includes a signal stack 42 for generating, sending, receiving, and processing signaling messages, such as those signaling messages necessary to control a call. Although not shown, mobile device 12 also includes a media stack such that mobile device 12 can process media, e.g. for other device users. Likewise, mobile device 16 includes media stack 36 and signal stack 46. For simplicity in the examples, mobile device 16, with media stack 36 and signal stack 46, is depicted as the destination of a call. However, the destination could also implement mobile device pass through for signaling messages with another smart device similar to smart device 14 and mobile device 16. Furthermore, although the examples presented below describe the smart device 14 initiating a call, this is only for simplicity and mobile device pass through for signaling messages also provides for smart device 14 to receive a call.

In step 501, the mobile device 12 is powered on. At step 502, the mobile device sends, in response to being powered on, a register message to the signal core 20. The register message, for example, is a SIP Register message sent to the SIP server 404 or the SIP application server 414. When the signal core 20 receives the register message at step 502, the signal core 20 determines if the mobile device 12 was previously authorized or if the register message contains credentials. If the mobile device 12 was not previously authorized or if the register message does not contain credentials, the signal core 20 sends an unauthorized message to the mobile device at step 503. The unauthorized message, for example, is a SIP Unauthorized message.

When the mobile device 12 receives the unauthorized message, the mobile device 12 sends, at step 504, a register message with credentials to the signal core 20. The register message, for example, is a SIP Register request and the credentials, for example, include a username or user identifier of the user of the mobile device 12. An example of the credential is user@vzw.com. The signal core 20 receives the register message with credentials and determines that the mobile device 12 is authorized. At step 505, the signal core 20 sends an authorized user message to mobile device 12. For example, signal core 20 sends a SIP Authorized User message to mobile device 12 as a response to the request from step 504.

Figure 6:
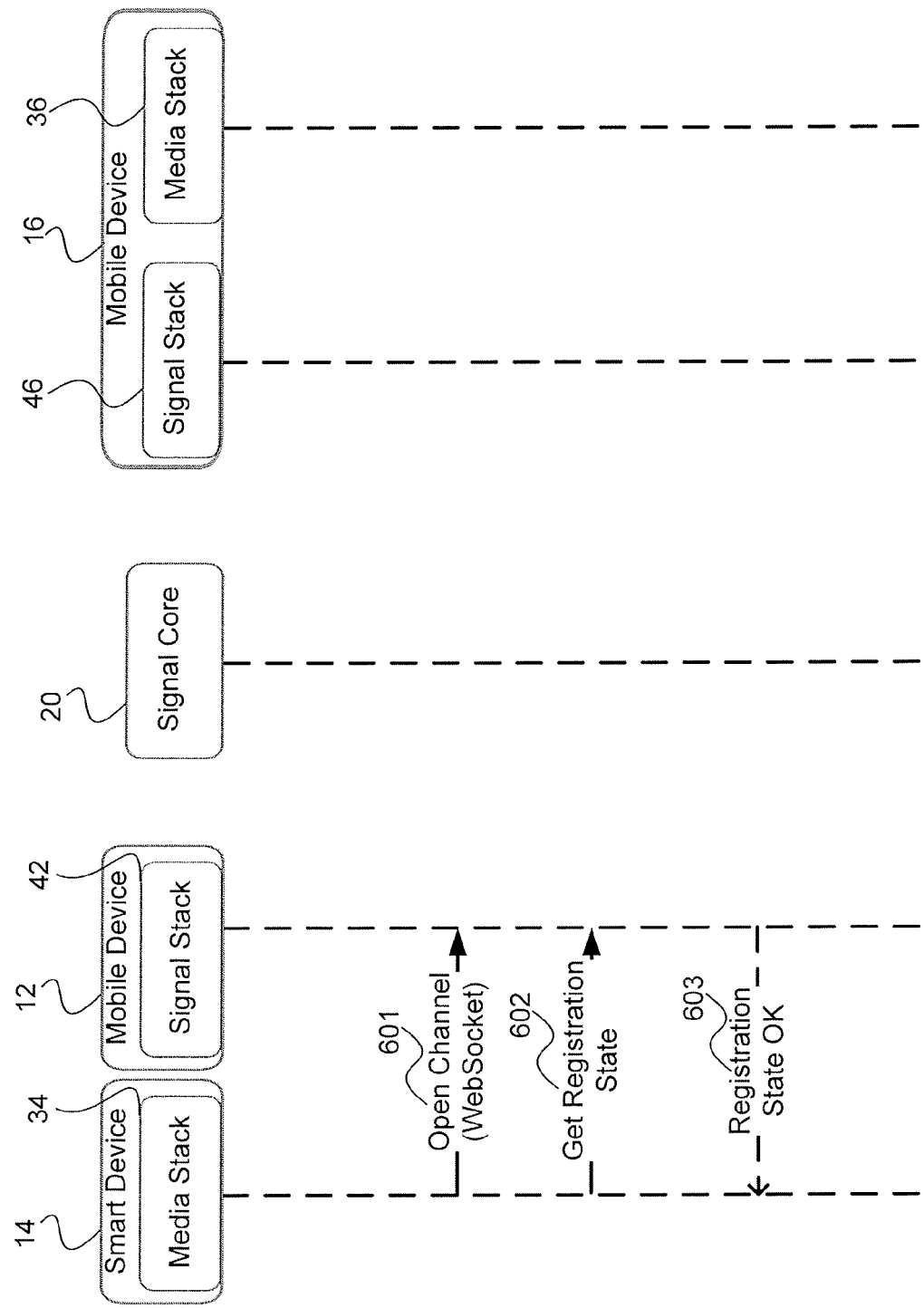
FIG. 6 is a high-level process flow of an example of a media path or application launch sequence, in a system like that of FIG. 1.

FIG. 6 is a high-level process flow of an example of a media path or application launch sequence utilizing mobile device pass through for signaling messages. In one example, a user of smart device 14 desires to establish a first channel of communications between smart device 14 and mobile device 12 in order to perform mobile device pass through for signaling messages. In the example, the mobile device 12 has completed a registration sequence, such as the registration sequence previously described in relation to FIG. 5, with the signal core 20. Although mobile device 12 has previously completed the registration sequence in this example, the previous registration is not required. The process of establishing the first channel of communications between smart device 14 and mobile device 12 could also prompt mobile device 12 to complete the registration sequence.

In step 601, the smart device 14 opens the channel of communications with the mobile device 12. For example, the user of smart device 14, in anticipation of initiating the call, launches a web browser on smart device 14 and enters the address of the mobile device 12 (e.g. user enters the uniform resource locator (URL) of the mobile device 12 in the web browser executing on smart device 14). The address (e.g. URL) of the mobile device 12 may be provided to the user by mobile device 12 for manual entry by the user and/or may be embedded or otherwise included in a configuration of the web browser such that the address is entered into the web browser automatically. In response to the user's actions, the web browser executing on the smart device 14 establishes the channel of communications with the mobile device 12. The channel of communications is, for example, a WebSocket. Alternatively, the channel of communications could be a Comet channel and/or any other form of full-duplex communications utilizing a single TCP connection. WebSocket is a protocol providing full-duplex communications channels over a single TCP connection. Typically, a WebSocket connection is established between a web server and a web browser using TCP port 80. Such a WebSocket connection allows for a stream of messages to flow between two devices.

In this example, the smart device 14 executes a web browser. The web browser executing on smart device 14, for example, implements a WebRTC API. The WebRTC API is an API that facilitates real time communications within a web browser. Although the examples described refer to the WebRTC API, this is only for simplicity and any API that translates and transports signaling messages between a web browser and a server, or between a media stack on one device and a signal stack on another device, could alternatively be utilized.

In step 602, the web browser executing on smart device 14 queries the registration status of mobile device 12. For example, the web browser executing on smart device 14 queries whether the mobile device 12 has completed a registration process, such as the SIP registration as described in relation to FIG. 5 above. If mobile device 12 has not completed the registration process, mobile device 12 will proceed, in one example, to complete the registration process as part of step 602 (not depicted). In step 603, the mobile device 12 returns a registration state OK message to the web browser executing on smart device 14. For example, the mobile device 12 informs the web browser executing on smart device 14 that the SIP registration, as described in relation to FIG. 5, was successful. In turn, the web browser may display a registration state OK message to the user of smart device 14 so that the user is aware, for example, that the call may be initiated.

Although not shown in FIG. 6, mobile device 12 may authenticate smart device 14 and/or the user of smart device 14, either prior to establishing the channel of communication or in response to the registration status query. Mobile device 12 determines, for example, if smart device 14 and mobile device 12 are logically located on the same subnet (e.g. share similar Internet Protocol (IP) addresses), in which case mobile device 12 does not require any further authentication from smart device 14 and smart device 14 is authorized to request mobile device 12 to generate control signals. Alternatively, mobile device 12 prompts, for example, the user of smart device 14 to enter a username and password, or some other type of credential, for authentication as part of the web page request process described above. For example, in response to the web browser establishing the channel of communication with mobile device 12, mobile device 12 may provide a web page to the web browser of smart device 14. The web page, in this example, requires the user of smart device 14 to enter a username and password into the web page and submit the web page with the entered username and password back to mobile device 12. Mobile device 12, upon verification of the username and password, then allows the channel of communication to be established.

Figure 7:
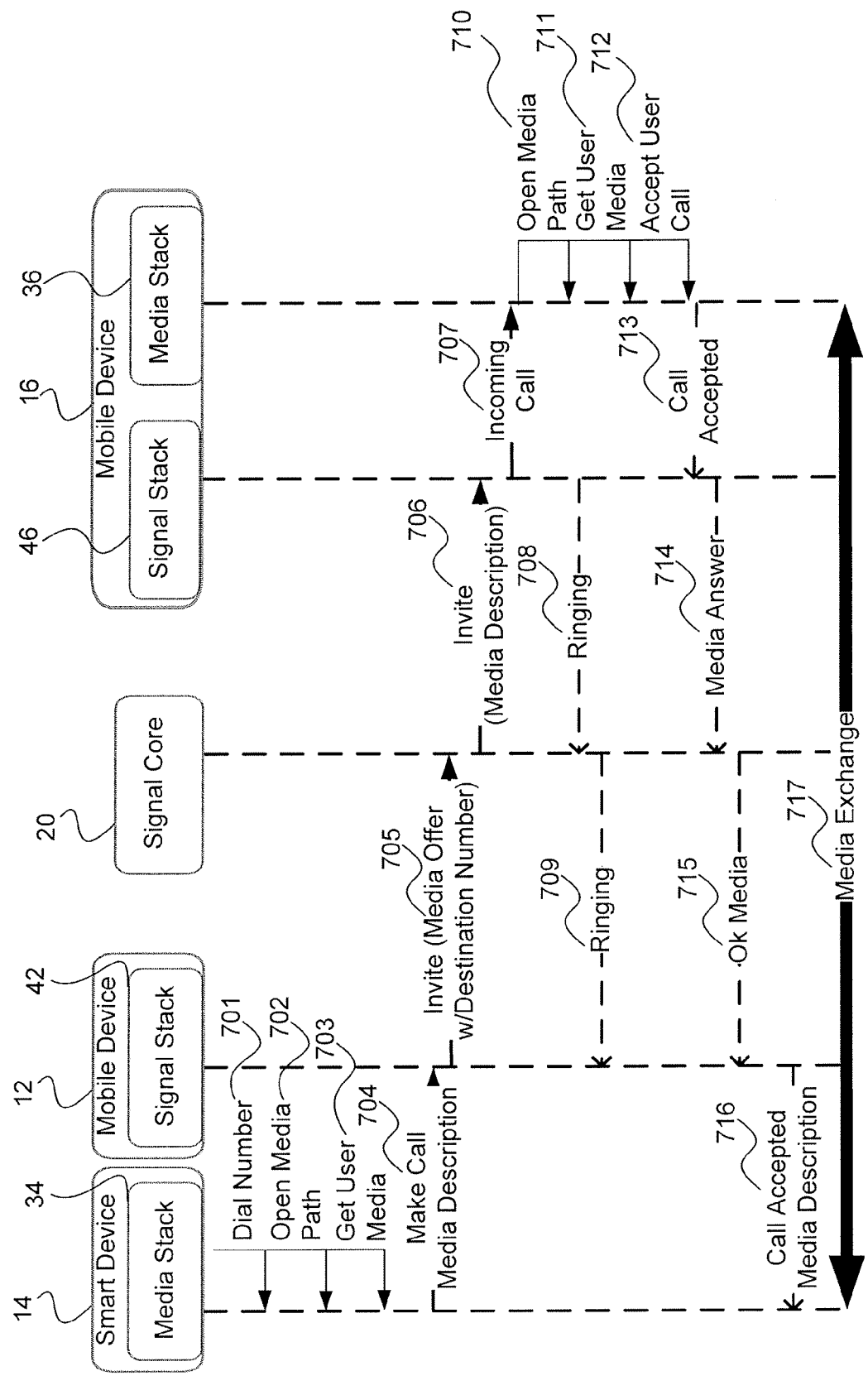
FIG. 7 is a high-level process flow of an example of a sequence to make and receive a call, in a system like that of FIG. 1.

FIG. 7 is a high-level process flow of an example of a sequence to make and receive a call utilizing mobile device pass through for signaling messages. In one example, the user of smart device 14 desires to call a user of mobile device 16. The call, for purposes of this example, is a voice call or a video call. The user of smart device 14 utilizes, at step 701, a web browser executing on smart device 14 to access a web application and dial a number or otherwise select mobile device 16 as a destination. The user of smart device 14, for example, knows the phone number associated with mobile device 16, looks up the phone number in a directory, or receives the number in response to a query (e.g. search performed in web-based application). The web application, for example, is a SIP-based calling service provided by a carrier, a service provider and/or other third party. For example, SIP application server 414 implements SIP-based calling services accessible via a web server (not shown)

providing the web application. The dialed number, in a SIP based dialed call example, is the number associated with the mobile device 16.

Continuing the example, at step 702, the web browser executing on smart device 14 opens a media path via media stack 34. For example, the web browser executing on smart device 14 opens a WebSocket connection over Wi-Fi with mobile device 12, as described above in relation to FIG. 6. In this example, the web browser executing on smart device 14 is able to access the web application, but is unable to generate control signals, e.g. SIP messages, related to the web-based application. Mobile device 12, however, is able to generate control signals, e.g. SIP messages, related to the web application. The WebRTC API implemented on smart device 14 in conjunction with a WebSocket connection, such as described in FIG. 6 and established in step 702, allows the web browser executing on the smart device 14 to pass requests for control signals to mobile device 12 and receive responses to requested control signals from mobile device 12.

At step 703, the web browser executing on smart device 14 gets user media via media stack 34. For example, the web browser requests access to a microphone, a camera, and/or speakers of smart device 14. The web browser executing on smart device 14 then, at step 704, requests the mobile device 12 to make the call. In our example, the web browser executing on smart device 14 uses the WebSocket established in response to the open media path step 702 to pass a make call request to mobile device 12. The make call request includes, for example, a media description of the call. The media description, for example, includes the dialed number as well as any other information necessary to make the call, such as the address of SIP server 404 and/or SIP application server 414.

Mobile device 12, after receiving the make call request at step 704, generates an invite message at step 705 via signal stack 42. The invite message includes the dialed number and is sent to the signal core 20. Although not shown, mobile device 12 may alternatively send the invite message, and any subsequent signaling messages, directly to mobile device 16 without signal core 20. The invite message, for example, is a SIP Invite and is sent to SIP 404 and/or SIP application server 414 of IMS 402. The signal core 20, in turn, delivers the invite message to the signal stack 46 of mobile device 16 at step 706.

Although the examples reference mobile device 16 for simplicity, the destination may be any device capable of receiving a voice and/or video call, including an additional smart device utilizing mobile device pass through for signaling messages as described herein. In such an example including an additional smart device, mobile device 16 is still the intended recipient of the control signals and mobile device 16 is the source of control signal responses. Additionally, mobile device 16 generates and receives the control signals and responses on behalf of the additional smart device in a similar fashion to mobile device 12. That is, in such an example, mobile device 16 may be replaced with mobile device 12 and smart device 14.

When the signal stack 46 of mobile device 16 receives the invite at step 706, the signal stack 46 of mobile device 16 informs the media stack 36 of mobile device 16 of the incoming call. The signal stack 46 is, for example, SIP and/or IMS APIs and the media stack 36 is, for example, an application providing support for the call. For example, the application may be the same or another web application providing a SIP-based calling service. The signal stack 46 of mobile device 16 also generates a ringing message back to the signal core 20 at step 708 and the signal core 20 forwards the ringing message to mobile device 12 at step 709. Alternatively, as mentioned above, if mobile device 12 sends the invite message directly to mobile device 16, mobile device 16 may send the ringing message, and any subsequent signaling messages, directly back to mobile device 12.

At step 710, the media stack 36 of mobile device 16 opens a media path and the media stack 36 gets user media at step 711. Similarly to the web browser of smart device 14 in step 703, for example, the media stack 36 requests access to a microphone, a camera, and/or speakers of mobile device 16. The media stack 36 also accepts the call at step 712 and generates a call accepted message to the signal stack 46 at step 713. The signal stack 46 then generates a media answer message at step 714 and forwards the media answer message to the signal core 20. The signal core 20, in turn, delivers an OK media message to mobile device 12 at step 715 and mobile device 12 delivers a call accepted message to the web browser executing on smart device 14 at step 716.

In step 717, a second channel of communications is established and media related to the call is exchanged directly between the web browser executing on smart device 14 via media stack 34 and the media stack 36 of mobile device 16. The second channel of communications is, for example, a TCP-based session directly between smart device 14 and mobile device 16, i.e., involving network elements but not passing through mobile device 12. As a further example, voice and/or video is sent from the web browser executing on smart device 14 directly to mobile device 16 over Wi-Fi via wireless access point 22, local router 24 and network 18 utilizing the TCP-based session, and/or any other protocol as is known to deliver media related to a call between two devices. Such voice and/or video is sent directly between smart device 14 and mobile device 16 without passing via mobile device 12 or the established WebSocket between the web browser executing on smart device 14 and mobile device 12. Control signals between smart device 14 and mobile device 16, however, as described below in reference to FIG. 8, still employ mobile device 12 as a pass through device.

Figure 8:
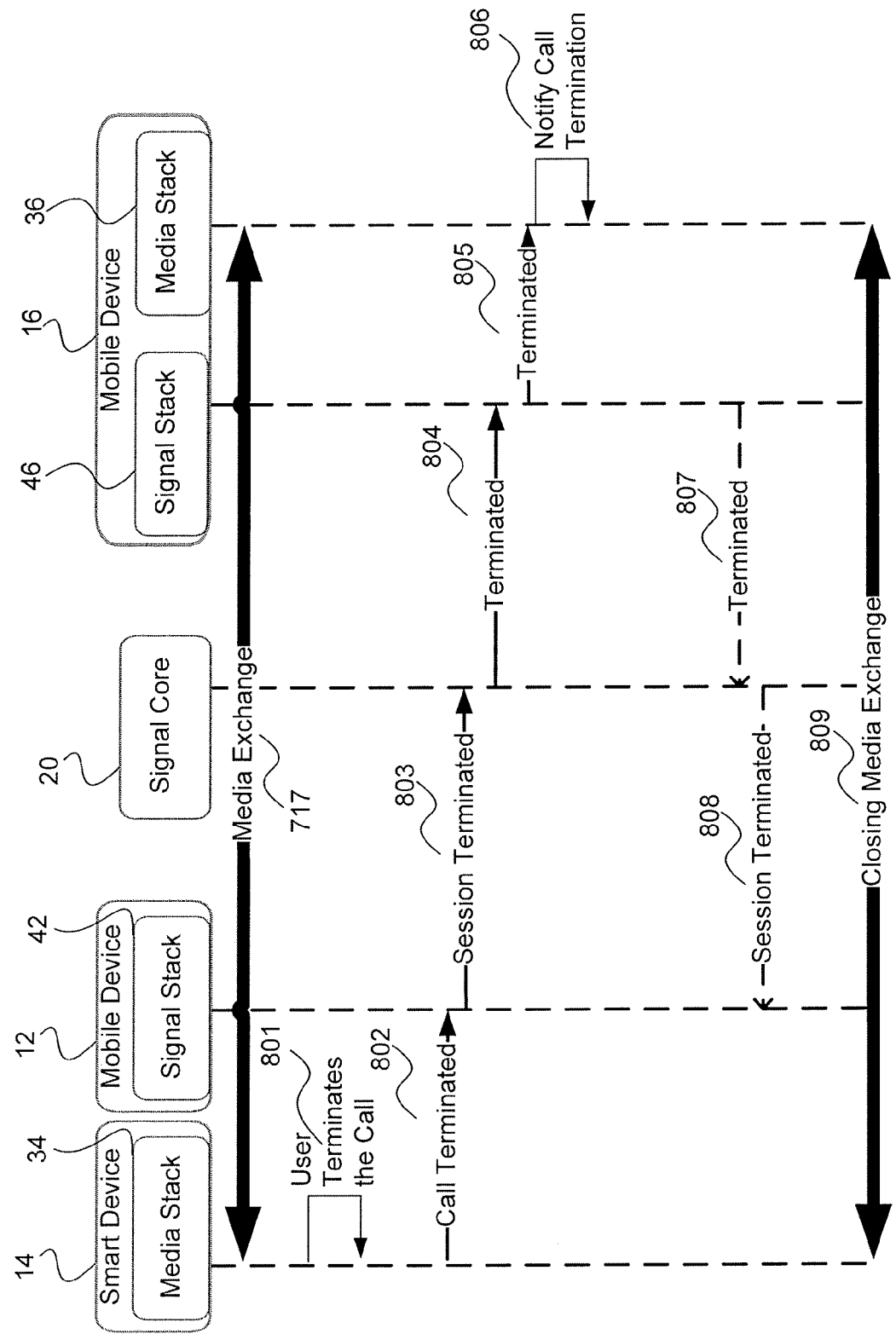
FIG. 8 is a high-level process flow of an example of a sequence to end a call, in a system like that of FIG. 1.

FIG. 8 is a high-level process flow of an example of a sequence to end a call that has utilized mobile device pass through for signaling messages. In one example, the user of smart device 14 has completed a call with mobile device 16 using procedures like those of FIGS. 5-7; and that user now desires to terminate the call. In the example, the user of smart device 14 utilizes the web browser executing on smart device 14 to terminate the call at step 801. The web browser executing on smart device 14 informs the mobile device 12 of such call termination by sending a call terminated message at step 802. The web browser executing on smart device 14, for example, utilizes the WebRTC API to send the call terminated message via the established WebSocket between the web browser executing on smart device 14 and mobile device 12. In turn, mobile device 12 sends via signal stack 42, in step 803, a session terminated message to signal core 20. As described above in relation to FIG. 7, signaling messages may alternatively be sent directly between mobile devices 12, 16 without sending to signal core 20. For example, mobile device 12 sends a SIP Session Terminated message to SIP 404 and/or SIP application server 414 in IMS 402. The signal core 20 then sends a terminated message to the signal stack 46 of mobile device 16 at step 804; and the signal stack 46 of mobile device 16 sends the terminated message to the media stack 36 of mobile device 16 at step 805.

The media stack 36 of mobile device 16, at step 806, informs the user of mobile device 16 of the call termination. For example, the application executing on mobile device 16 and supporting the call generates a notice and displays the notice to the user. The signal stack 46 of mobile device 16 also sends a terminated message to signal core 20 at step 807. The terminated message, for example, is a SIP Terminated message. The signal core 20 then sends the terminated message to the mobile device 12 at step 808. For example, signal core 20 sends a SIP Terminated message to mobile device 12. At step 809, the media exchange directly between the web browser executing on smart device 14 and the mobile device 16 is closed. For example, the TCP-based session between smart device 14 and mobile device 16 is terminated.

The examples above related to FIGS. 7 and 8 describe a process flow for call initiation and termination. Such examples assume smart device 14 initiates and terminates the call. Mobile device 16, however, may alternatively initiate and/or terminate the call, in which case the flows in FIGS. 7 and 8 would simply be reversed.

Although the above examples describe initiation of a call by a web browser executing on smart device 14, such initiation does not have to occur on smart device 14. Alternatively, steps 701-705 of FIG. 7 may be performed directly on mobile device 12. For example, the user may decide to initiate the call while using mobile device 12 directly. In this example, the user may then decide smart device 14 provides a better environment in which to conduct the call. For example, the call is initially a voice call and the user subsequently desires to add video to the call, which would be better displayed on smart device 14. Or, the call is initially a video call with only one other party, but then the user desires to add additional parties, which would be better displayed on smart device 14.

Once the user decides to use smart device 14, the user executes the web browser on smart device 14 and accesses the same web application supporting the call. As in the previous examples, the web application is a SIP-based calling service and the user utilizes the web browser executing on smart device 14 to access the SIP-based calling service. At this point, the web browser executing on smart device 14 establishes a channel of communications with mobile device 12, as described in relation to FIG. 6 above. The web browser executing on the smart device 14 then utilizes, for example, the WebRTC API implemented on smart device 14 to pass control signals related to the call to mobile device 12 over the established WebSocket, as described in FIGS. 7 and 8. The web application also redirects the media exchange to occur directly between the web browser executing on smart device 14 and mobile device 16. In this way, the call is transitioned from the mobile device 12 to smart device 14. The process may also be reversed to transition the call from smart device 14 to mobile device 12.

In general, mobile device pass through for signaling messages, as described in the various examples, provides a user the flexibility to select the device, either mobile device 12 or smart device 14, that is best situated to participate in a call. Mobile device pass through for signaling messages also provides the user the flexibility to change the device selection during the call. Where the user selects the smart device 14 or transfers the call to the smart device 14, the call set-up, transfer and/or termination rely on the native signaling capability of the mobile device 12 without requiring similar capability in the smart device 14.

In addition, although the various examples depict call initiation and termination, in particular utilizing SIP, such specific call processing and/or use of SIP signaling are given by way of example and for simplicity only. Therefore, the principles of mobile device pass through for signaling messages, as described above, may be applied to any other situation where signaling messages are generated and passed by a device level system or framework API specific to the mobile device. The technique may also apply in a situation, for example, where a mobile device is able to generate and deliver a signaling message to a destination for which the smart device cannot. One such situation may be a mobile device delivering a print request to a printer for which the smart device does not have the driver and/or necessary capability to submit the print request itself.

Mobile device pass through for signaling messages has been described by way of examples, only. Such mobile device pass through for signaling messages, as described above, may be implemented by configuration of computer platforms as in the SIP server 404 and/or SIP application server 414. Such configuration typically entails programming for the processors. Therefore, it may be helpful to briefly consider programmable computers, e.g. for server operations and/or for other types of end user or terminal devices.

Figures 9, 10:
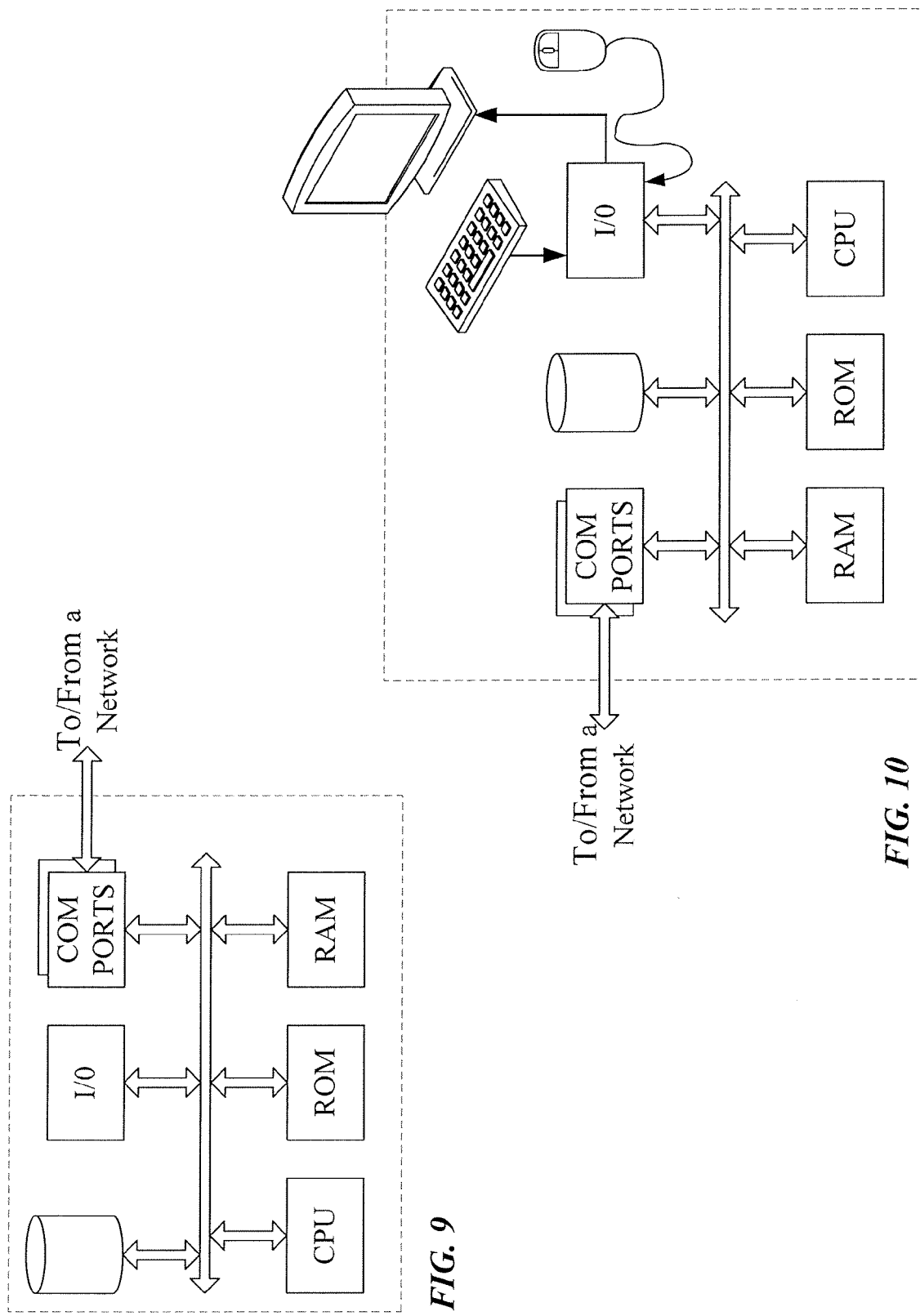
FIG. 9 is a simplified functional block diagram of a computer that may be configured as a host or server, for example, to function as the SIP application server in the system of FIG. 4.
FIG. 10 is a simplified functional block diagram of a personal computer or other work station or terminal device.

FIGS. 9 and 10 provide functional block diagram illustrations of general purpose computer hardware platforms. FIG. 9 illustrates a network or host computer platform, as may typically be used to implement a server. Such network or host computer may be used, for example, to implement the various elements of the IMS 402 such as CSCF 410, SIP server 404, or SIP application server 414. FIG. 10 depicts a computer with user interface elements, as may be used to implement a personal computer or other type of work station or terminal device, such as the smart device 14 of FIG. 1. The computer of FIG. 10, however, may also act as a server if appropriately programmed. It is believed that the general structure and general operation of such equipment as shown in FIGS. 9 and 10 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 9). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the mobile device pass through for signaling messages outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, or from a host server into a mobile device 12. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the CSCF 410, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
establishing a first channel of communications between a web browser executing on a user terminal and an application programming interface (API) on a mobile device, wherein:
the user terminal is unable to independently generate signaling messages without using the mobile device;
the user terminal and the mobile device are both connected to a particular local area network;
the first channel of communications is established via the particular local area network;
the web browser executing on the user terminal accesses a web application; and
the web application utilizes the API on the mobile device to generate a signaling message directed to an intended recipient device related to the web application;
receiving a request, by the mobile device from the web browser executing on the user terminal and via the established first channel of communications, to generate the signaling message directed to the intended recipient device related to the web application via the API on the mobile device;
generating, by the mobile device and in response to the received request, the requested signaling message related to the web application via the API on the mobile device; and
transmitting, by the mobile device, the generated signaling message directed to the intended recipient device, wherein:
the generated signaling message relates to control of media content related to the web application; and
receipt, by the intended recipient device, of the generated signaling message causes a second channel of communications to be established between the intended recipient device and the user terminal, wherein, when the second channel of communications is established, the media content related to the web application is communicated at least to or from the web browser executing on the user terminal without passing via the established first channel of communications between the web browser executing on the user terminal and the mobile device.

2. The method of claim 1, wherein the mobile device receives the request to generate the signaling message from the web browser executing on the user terminal implementing a Web Real Time Communication (WebRTC) API.

3. The method of claim 1, wherein the established first channel of communications is a WebSocket.

4. The method of claim 1, wherein establishing the first channel of communications further comprises:
authenticating, by the mobile device, the web browser executing on the user terminal; and
authorizing, by the mobile device, the web browser executing on the user terminal to request the API on the mobile device to generate signaling messages.

5. The method of claim 1, wherein:
generating the signaling message related to the web application via the API on the mobile device further comprises:
establishing a third channel of communications between the API on the mobile device and a signal core related to the API; and
transmitting the generated signaling message further comprises:
delivering, via the signal core related to the API, the generated signaling message to the intended recipient device.

6. The method of claim 5, wherein establishing the third channel of communications further comprises:
registering, by the API on the mobile device, the API on the mobile device with the signal core related to the API; and
receiving, from the signal core related to the API, authorization for the API on the mobile device to deliver the generated signaling message via the signal core related to the API.

7. The method of claim 1, wherein:
the API on the mobile device is a Session Initiation Protocol (SIP) API, IP Multimedia Subsystem (IMS) API, or other device level system or framework API specific to the mobile device; and
the API is available on the mobile device but not available on the user terminal.

8. The method of claim 1, further comprising:
accessing, by the mobile device and prior to establishing the first channel of communications, the web application; and
discontinuing accessing, by the mobile device after establishing the first channel of communications and after the web browser executing on the user terminal begins accessing the web application, the web application.

9. A mobile device, comprising:
a wireless transceiver configured to provide communications through a network via a wireless link;
a processor configured to control operations of the mobile device;
a memory;
an application programming interface (API) in the memory; and
an application program in the memory for execution by the processor, wherein the processor executes the application program to cause the mobile device to:
establish a first channel of communications with a web browser executing on a user terminal, wherein:
the user terminal is unable to independently generate signaling messages without using the mobile device;
the mobile device and the user terminal are both connected to a particular local area network;
the first channel of communications is established via the particular local area network;
the web browser executing on the user terminal accesses a web application; and
the web application utilizes the API on the mobile device to generate a signaling message directed to an intended recipient device related to the web application;
receive a request, from the web browser executing on the user terminal via the established first channel of communications, to generate the signaling message directed to the intended recipient device related to the web application via the API on the mobile device;
generate the requested signaling message directed to the intended recipient device related to the web application via the API on the mobile device; and
transmit the generated signaling message directed to the intended recipient device, wherein:
the generated signaling message relates to control of media content related to the web application; and receipt, by the intended recipient device, of the generated signaling message causes a second channel of communications to be established between the intended recipient device and the user terminal, wherein, when the second channel of communications is established, the media content related to the web application is communicated at least to or from the web browser executing on the user terminal without passing via the established first channel of communications.

10. The mobile device of claim 9, wherein the processor further executes the application program to cause the mobile device to receive the request to generate the signaling message from the web browser executing on the user terminal implementing a Web Real Time Communication (WebRTC) API.

11. The mobile device of claim 9, wherein the established first channel of communications is a Web Socket.

12. The mobile device of claim 9, wherein, when generating the requested signaling message related to the web application via the API on the mobile device, the processor further executes the application program to cause the mobile device to:
establish a third channel of communications between the API on the mobile device and a signal core related to the API; and
wherein, when transmitting the generated signaling message, the processor further executes the application program to cause the mobile device to:
deliver, via the signal core related to the API, the generated signaling message to the intended recipient device.

13. The mobile device of claim 12, wherein, when establishing the third channel of communications, the processor further executes the application program to cause the mobile device to:
register the API on the mobile device with the signal core related to the API; and
receive, from the signal core related to the API, authorization to deliver the generated signaling message via the signal core related to the API.

14. The mobile device of claim 9, wherein:
the API is a Session Initiation Protocol (SIP) API, IP Multimedia Subsystem (IMS) API, or other device level system or framework API specific to the mobile device; and
the API is available on the mobile device but not available on the user terminal.

15. The mobile device of claim 9, wherein the processor further executes the application program to cause the mobile device to:
access the web application, prior to establishing the first channel of communications with the web browser executing on the user terminal; and
discontinue accessing the web application, after establishing the first channel of communications and the web browser executing on the user terminal initiates access to the web application.

16. A method, comprising:
establishing a first channel of communications between a web browser executing on a user terminal and an application programming interface (API) on a mobile device, wherein:
the user terminal is unable to independently generate signaling messages without using the mobile device;
the user terminal and the mobile device are each connected to a particular local area network;
the first channel of communications is established via the particular local area network;
the web browser executing on the user terminal accesses a web application; and
the web application utilizes the API on the mobile device to generate a signaling message directed to an intended recipient device related to the web application;
requesting, by the web browser executing on the user terminal and via the established first channel of communications, the API on the mobile device to generate and transmit the signaling message directed to the intended recipient device, wherein receipt, by the intended recipient device, of the signaling message causes a second channel of communications to be established between the intended recipient device and the user terminal; and
receiving or sending, by the web browser executing on the user terminal and in response to the signaling message generated by the API on the mobile device, media content related to the web application, wherein:
the signaling message generated by the API on the mobile device relates to control of the media content related to the web application; and
the media content related to the web application is communicated at least to or from the web browser executing on the user terminal via the second channel of communications without passing via the established first channel of communications.

17. The method of claim 16, wherein the web browser executing on the user terminal implements a Web Real Time Communication (WebRTC) API.

18. The method of claim 16, wherein the established first channel of communications is a Web Socket.

19. The method of claim 16, wherein:
the API on the mobile device is a Session Initiation Protocol (SIP) API, IP Multimedia Subsystem (IMS) API, or other device level system or framework API specific to the mobile device; and
the API is available on the mobile device but not available on the user terminal.

20. The method of claim 16, further comprising:
requesting, by the web browser executing on the user terminal and via the established first channel of communications, the mobile device to discontinue accessing the web application currently being accessed by the web browser executing on the user terminal,
wherein the mobile device accessed the web application prior to establishing the first channel of communications.

* * * * *